United States Patent [19]

Takata et al.

[11] Patent Number: 5,189,545

[45] Date of Patent: Feb. 23, 1993

[54] OPTICAL DEFLECTOR AND DISPLAY UNIT USING THE SAME

[75] Inventors: Yutaka Takata; Hiroo Kobayashi, both of Nagaokakyo, Japan

[73] Assignee: Mitsubishi Denki Kabushiki Kaisha, Tokyo, Japan

[21] Appl. No.: 807,614

[22] Filed: Dec. 13, 1991

Related U.S. Application Data

[63] Continuation of Ser. No. 519,453, May 4, 1990, abandoned.

[30] Foreign Application Priority Data

May 18, 1989 [JP] Japan .................................. 1-127236
Oct. 31, 1989 [JP] Japan .................................. 1-284471

[51] Int. Cl.$^5$ ...................... G02B 26/08; G02B 27/64
[52] U.S. Cl. .................................. 359/197; 359/198; 359/211; 359/557
[58] Field of Search ................ 350/616, 632, 6.1–6.91, 350/286–287; 356/400, 248–250; 358/87, 108, 238, 239, 480, 481, 494, 795; 250/234–236, 201.1–201.8; 340/795; 359/554–557, 196–226, 831, 837, 843, 877, 900, 903; 73/505–517 B

[56] References Cited

U.S. PATENT DOCUMENTS

| | | | |
|---|---|---|---|
| 2,222,937 | 11/1940 | Dimmick | 358/494 |
| 3,511,551 | 5/1970 | Matulka | 350/6.4 |
| 3,731,098 | 5/1973 | Hunt | 250/234 |
| 3,746,421 | 7/1973 | Yoder | 350/6.4 |
| 3,941,980 | 3/1976 | Okamoto et al. | 356/400 |
| 4,043,672 | 8/1977 | Baumgartner | 358/87 |
| 4,099,172 | 7/1978 | Montanari et al. | 350/6.4 |
| 4,168,126 | 9/1978 | Altman et al. | 350/6.4 |
| 4,186,991 | 2/1980 | Koide et al. | 359/198 |
| 4,820,005 | 4/1989 | Hashimoto et al. | 350/616 |
| 4,856,858 | 8/1989 | Koike et al. | 359/198 |
| 4,869,583 | 9/1989 | Tiedje | 350/636 |
| 4,907,868 | 3/1990 | Kitagishi et al. | 359/557 |
| 4,996,545 | 2/1991 | Enomoto et al. | 359/554 |

FOREIGN PATENT DOCUMENTS

| | | | |
|---|---|---|---|
| 2422435 | 11/1975 | Fed. Rep. of Germany | 350/6.4 |
| 459868 | 4/1975 | U.S.S.R. | 350/6.4 |
| 1429290 | 3/1976 | United Kingdom . | |
| 1483118 | 8/1977 | United Kingdom . | |
| 1541260 | 2/1979 | United Kingdom . | |
| 1556669 | 11/1979 | United Kingdom . | |
| 1564407 | 4/1980 | United Kingdom . | |
| 2047424 | 11/1980 | United Kingdom . | |

OTHER PUBLICATIONS

IBM Technical Disclosure Bulletin, "Prism Scanner for High Throughput Drilliup of Holes with $CO_2$ Laser", vol. 30, v. 10, Mar. 1988, pp. 78–79.

*Primary Examiner*—Bruce Y. Arnold
*Assistant Examiner*—Thong Nguyen

[57] ABSTRACT

An optical deflector is disclosed in which a polygonal prism is rotatively driven by a polygonal prism driving circuit and an emergent light beam from the polygonal prism effects repeated scanning with the rotation of the polygonal prism. Also disclosed is a display unit in which an image for one horizontal cycle displayed on a one-horizontal-scanning-line display device is vertically scanned by an optical deflector using a polygonal prism or a rotating mirror so as to be sent to a visual point via an eyepiece.

14 Claims, 13 Drawing Sheets

OPTICAL DEFLECTOR AND DISPLAY UNIT USING THE SAME

This application is a continuation of application Ser. No. 07/519,453 filed on May 4, 1990, now abandoned.

BACKGROUND OF THE INVENTION

1. Field of the Invention

The present invention relates to an optical deflector wherein a beam of light made incident thereupon is deflected and made emergent therefrom, and a display unit for displaying an image by using the optical deflector.

2. Description of Background Art

Conventionally, optical deflectors having various arrangements are known.

FIGS. 14 and 15 illustrate an operating principle of an optical deflector described, for instance, on page 86 and onwards of the "Optical Communication Circuit and System" (1st edition published by OHMSHA, LTD. on Feb. 25, 1987).

This optical deflector is an optical switch operated by changing the angle of a rhomboid prism.

Specifically, the angle of a rhomboid prism 1 provided in this optical deflector is changed between a first position shown in FIG. 14 and a second position shown in FIG. 15 by an unillustrated driving device using an electromagnet or the like.

In the first position, light beams 2-1 and 2-2 are made incident perpendicularly to a side 1a of the rhomboid prism 1. In this case, the light beams 2-1 and 2-2 advance straight through the interior of the rhomboid prism 1 and are made emergent from a side 1b opposing the side 1a.

In the second position, the light beams 2-1 and 2-2 are made emergent upon the rhomboid prism 1 in such a manner as to straddle an apex 1c of the rhomboid prism 1. In this case, the light beams 2-1 and 2-2, when made incident, are refracted, intersect each other inside the rhomboid prism 1, and are made emergent from the vicinity of an apex 1d opposing the apex 1c in a vertically inverted positional relationship, as viewed in the drawing, compared with the positional relationship of incidence.

It should be noted that the rhomboid prism 1 has a greater refractive index than the atmosphere.

Such an optical deflector is used in, for instance, the field of optical communication as a 2 × 2 optical switch for supplying incident light beams of two systems by changing them between two optical paths, respectively.

Meanwhile, optical deflectors for repeatedly scanning a fixed range are also known.

In the optical deflector using the aforementioned rhomboid prism 1, if the rhomboid prism 1 is rotated, the direction of emergence of the light beam is not displaced in a fixed cycle, and the range of displacement changes each time a side relating to the incidence changes. Since this type of optical deflector is not suitable for repeated scanning, optical deflectors which will be described below are used in telecine apparatuses requiring such scanning.

Optical deflectors suitable for repeated scanning are described in, for instance, "4.1 Applications of Laser Scanning Technology to Information Equipment" (The Journal of the Institute of Electronics and Communication Engineers of Japan, p. 372, Apr. 1985 edition). This optical deflector employs a rotating polygonal mirror, a galvanometer, or a rotating hologram plate.

Optical deflectors having such arrangements are used for laser printers, POS scanners, telecine apparatuses for converting an image of a motion picture into a television signal, or other similar equipment.

However, the following drawbacks are experienced with the aforementioned types of optical deflectors used for repeated scanning.

First, the optical deflector using a rotating polygonal mirror realizes repeated scanning by making use of an angular change of a reflected light beam resulting from the rotation of the rotating polygonal mirror. Therefore, an angle double an apex angle of a rotating polygonal mirror is obtained as a deflection angle of repeated scanning. For instance, in a case where a deflection angle of 30 degrees or thereabouts is required, a 25-sided mirror is required as the rotating polygonal mirror. In order to enhance the accuracy of the deflection angle in such a rotating polygonal mirror having a large number of apexes, it is necessary to increase the diameter of the rotating polygonal mirror by a certain degree, e.g., to 4-6 cm or thereabouts, for purposes of processing. This brings about disadvantages in that the optical deflector becomes large in size and that the driving electric power for the rotating polygonal mirror becomes large.

In the case of the optical deflector using the galvanometer, it is possible to make the arrangement compact as compared with the optical deflector using a rotating polygonal mirror. However, since an electromagnetic means is used to drive the mirror, a limit to a scanning cycle is 1 kHz or thereabouts, so that high-speed scanning is difficult.

In addition, with the optical deflector using the rotating hologram plate, the optical system can be realized with a simple arrangement, and this optical deflector is advantageous in that mass-production efficiency of rotating hologram plates is good. However, this type of optical deflector has drawbacks in that the scanning path is not rectilinear but arcuate and that the chromatic aberration is large.

SUMMARY OF THE INVENTION

Accordingly, the present invention is aimed at overcoming the above-described drawbacks of the conventional art by expanding the range of application of an optical deflector.

Namely, a primary object of the present invention is to provide an optical deflector which has a simple arrangement, can be made into a compact size, and is capable of high-speed scanning.

A second object of the present invention is to realize a display unit for displaying a monochrome or color image as an apparatus using an optical deflector.

To attain these objects, particularly the first object, an optical deflector in accordance with the present invention comprises: (a) a polygonal prism constituted by a regular n-sided (n: even number) prism for allowing a light beam made incident upon one side surface thereof to be made emergent in a substantially parallel direction to a direction of incidence from a side surface thereof opposing the side surface relating to incidence; and (b) a polygonal prism driving circuit for rotating said polygonal prism with a central axis of said polygonal prism as a reference at a predetermined speed.

The operating principal of the optical deflector having the above-described arrangement is as follows.

In a regular n-sided prism, mutually opposing side surfaces are in parallel positional relationship with each other. An angle of incidence upon one side surface is equal to an angle of emergence from the side surface opposing thereto, so that the direction of incidence becomes parallel with the direction of emergence. However, an incident position and an emergent position are displaced by a certain amount on a plane perpendicular to an axis of the polygonal prism.

Now, an amount of displacement y of the emergent position with respect to an incident angle i (equivalent to an emergent angle, as described above) and the incident position are in a relationship expressed by the following Formula (1):

$$y = d * \sin(i * (1 - 1/n_r)) \dots \quad (1)$$

where $n_r$ is a refractive index of a substance forming the polygonal prism, and d is a distance between opposing surfaces of the polygonal prism.

The incident angle i varies with the rotation of the polygonal prism. Correspondingly, the amount of displacement y also changes. Here, since the prism used is a polygonal prism, and particularly an even-number-sided prism, if the incident position reaches an apex, the change in the amount of displacement y turns back. Namely, the region expressed by 2d is repeated.

Accordingly, if a light beam is made incident upon a side surface of the polygonal prism in a perpendicular direction to the central axis of the polygonal prism, and the polygonal prism is rotated at a predetermined speed by the polygonal prism driving circuit, it is possible to effect repeated scanning over a fixed area by the emergent light beam at a predetermined cycle.

The optical deflector based on the above-described operating principle can be arranged compactly using a polygonal prism and a driving circuit therefor alone, and high-speed scanning by setting the rotational speed of the polygonal prism and the like is made possible.

Incidentally, production is facilitated if the polygonal prism is formed into a configuration having a less number of sides such as a regular quadrangular prism, a regular hexagonal prism, a regular octagonal prism, or the like.

Furthermore, if the optical deflector further comprises (c) a concave lens for allowing the light beam made emergent from said polygonal prism to be enlarged and projected onto a screen, then the optical deflector can be mounted on a display unit having a projecting function.

In addition, the polygonal prism driving circuit preferably includes: (b1) a motor for rotating said polygonal prism with the central axis of said polygonal prism as a reference; and (b2) a motor driving device for rotating said motor at a predetermined speed.

By virtue of the above-described arrangement, the polygonal prism driving circuit can be realized simply.

If the optical deflector of the present invention is to be used as a means for stabilizing an optical path, e.g., a compensator for unintentional movement of the hands during photographing of a picture, it suffices if the polygonal prism driving circuit is provided with an acceleration sensor for detecting an acceleration. In this case, the motor driving device adjusts the rotational angle of the motor in correspondence with the acceleration detected by the acceleration sensor.

In this application, it also suffices if the motor and the motor driving device are respectively substituted by an electromagnet and an electromagnet driving device. In this case, the electromagnet stops the polygonal prism at a predetermined position with the central axis of the polygonal prism as a reference, while the electromagnet driving device controls the stopping position of the polygonal prism in response to the acceleration detected by the acceleration sensor.

Also, in this application, since the incident position does not change in the axial direction, the configuration of the polygonal prism may be a polygonal flat plate.

Next, to attain the second object of the invention, a display unit in accordance with the present invention comprises: (a) a one-horizontal-scanning-line display device for displaying an image for one cycle of horizontal scanning linearly and by being changed in correspondence with vertical scanning; (b) an optical deflector including (b1) a polygonal prism constituted by a regular n-sided (n: even number) prism for allowing a light beam made incident upon one side surface thereof by said one-horizontal-scanning-line display device to be made emergent in a substantially parallel direction to a direction of incidence from a side surface thereof opposing the side surface relating to incidence, a central axis of said optical deflector being arranged in such a manner as to be parallel with a direction of display by said one-horizontal-scanning-line display device; and (b2) a polygonal prism driving circuit for rotating said polygonal prism with a central axis of said polygonal prism as a reference at a speed corresponding to a cycle of vertical scanning; and (c) an eyepiece for allowing the light beam made emergent from said polygonal prism to be converged upon a predetermined focal point.

Here, the optical deflector is the one relating to the aforementioned operating principle (Formula (1)).

Generally, a television picture is subjected to vertical and horizontal scanning, and is displayed on a display unit. An image corresponding to one horizontal scanning line displayed on the one-horizontal-scanning-line display device is made emergent while being subjected to vertical scanning by the optical deflector. The light beam made emergent from the optical deflector is focused by the eyepiece.

Accordingly, when the human eye is placed at the focal position of the eyepiece, the image is viewed as if the television picture is depicted on an extension of the optical path of the light focused by the eyepiece.

As a result, the display unit can be arranged by the one-horizontal-scanning-line display unit which does not require picture elements in a vertical direction, so that a compact display unit can be obtained.

Furthermore, said one-horizontal-scanning-line display device may include: (a1) a light source for supplying the light beam; (a2) a reflecting mirror for converting the light beam supplied from said light source into parallel light beams; (a3) a liquid-crystal optical shutter array for allowing the parallel light beams from said reflecting mirror to be transmitted therethrough or shielded thereby for each picture element in a horizontal scanning direction in correspondence with a voltage applied thereto; and (a4) a converging lens for allowing the light beam from said liquid-crystal optical shutter array to be converged in the vicinity of a predetermined axis and to be made incident upon said polygonal prism.

In other words, the light beam supplied from the light source is reflected by the reflecting mirror, and is supplied to the optical deflector via the liquid-crystal optical shutter array and the converging lens.

The liquid-crystal optical shutter array allows the parallel light beams from the reflecting mirror to be transmitted therethrough or shielded thereby in correspondence with an applied voltage thereto. When the light beam is transmitted therethrough, the light source is supplied to the optical deflector via the converging lens, whereas when it is shielded, it is not supplied to the optical deflector. Accordingly, if the light beam is transmitted through the liquid-crystal optical shutter array, a picture element of a predetermined color and a picture element of black color can be displayed. If the transmission of the light beam through the liquid-crystal optical shutter array and the shielding thereof by the liquid-crystal optical shutter array are effected for each block in which a predetermined number of picture elements in the horizontal scanning direction are grouped together, the display can be conducted at high speed and the contrast can be improved.

It should be noted that the converging lens converges the light beams from the liquid-crystal optical shutter arrays, supplies the converged light beam to the polygonal prism, and makes repeated scanning possible. This converging lens may be formed by combining a plurality of cylindrical lenses.

Generally, as for the size of a picture element in a conventional color liquid-crystal display unit, the smallest picture element has a size of several tens of microns by several tens of microns. For instance, if a display unit with a diagonal of 20 mm or thereabouts for a viewfinder of a television camera is to be realized by a color liquid crystal, limits of the number of horizontal picture elements and the number of vertical picture elements are 300-400 and 250 or thereabouts, respectively. In addition, the number of horizontal picture elements per color is between 100-130 or thereabouts, the number being one-third of the number of horizontal picture elements. For this reason, such a display unit is able to realize a resolution substantially lower than the resolution of an imaging device of a television camera. In addition, since the number of picture elements is substantially smaller than the number of effective scanning lines (vertical) in the NTSC method which is 500, such a display unit is not sufficient for a focussing operation of a television camera.

The display unit using the liquid-crystal optical shutter arrays of the present invention is capable of enhancing the vertical resolution to a high level by virtue of the rotational speed of the polygonal prism and the displaying switching speed of the liquid-crystal optical shutter arrays.

In addition, the display unit using the liquid-crystal optical shutter arrays of the present invention can be arranged compactly since the picture elements are arrayed in the horizontal direction only. Furthermore, with the conventional liquid crystal display unit, a fraction defective of 3/1,000,000 is repeatedly multiplied with respect to 100,000 picture elements, with the result that the fraction defective becomes 30%. Thus, the yield of production is low, resulting in high prices. In the present invention, since the number of picture elements can be reduced, it is possible to provide liquid crystal display units at low cost.

In order to realize a color display unit by using the display unit of the invention, it suffices if three units of the liquid-crystal optical shutter arrays are provided, and each of said liquid-crystal optical shutter arrays includes a filter for allowing a light of different color components among the three primary-color components to be transmitted therethrough.

If the above-described arrangement is provided, in the case of a liquid-crystal optical shutter array having a filter which transmits, for instance, red light therethrough, red light is transmitted therethrough or shielded thereby, and color display becomes possible through synthesis of light beams transmitted through the respective liquid-crystal optical shutter arrays.

Additionally, it also suffices if two of the three liquid-crystal optical shutter arrays are substituted by one liquid-crystal optical shutter array having two filters. In this case, the one-horizontal-scanning-line display device becomes more compact. The colors of the light transmitted through the filters of the substituting liquid-crystal optical shutter array is preferably red and blue.

As for the form of arrangement of the filters in the liquid-crystal optical shutter array having two filters, the filters are preferably arranged alternately in correspondence with picture elements.

The second object of the present invention can be attained by a display unit comprising: (a) a one-horizontal-scanning-line display device for displaying an image for one cycle of horizontal scanning linearly and by being changed in correspondence with vertical scanning; (b) an optical deflector including (b1) a movable mirror disposed in such a manner as to allow a light beam made emergent from said one-horizontal-scanning-line display device to be made emergent therefrom in a predetermined direction, said optical deflector having a swinging axis arranged in a parallel direction to a direction of display by said one-horizontal scanning-line display device; and (b2) a galvanometer driving circuit for causing said movable mirror to swing at a cycle corresponding to vertical scanning; and (c) an eyepiece for causing the light beam to be emergent from said movable mirror to be converged upon a predetermined focal point.

The display unit can also be made compact by the above-described arrangement.

In the display unit constructed as described above, it is preferred that the one-horizontal-scanning-line display device is arranged in a similar manner to the display unit using the aforementioned polygonal prism.

Furthermore, it also suffices if three units of said liquid-crystal optical shutter arrays are provided, and each of said liquid-crystal optical shutter arrays includes a filter for allowing a light of different color components among the three primary-color components to be transmitted therethrough. In this case, the display unit is used as a color liquid crystal display unit.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will become more apparent from the following detailed description of the invention when taken in conjunction with the accompanying drawings which are given by way of illustration only and thus are not limitative of the present invention, and wherein.

DESCRIPTION OF THE PREFERRED EMBODIMENTS

Referring now to the accompanying drawings, a description will be given of the preferred embodiments of the present invention.

(1) First Embodiment

Figure 1:
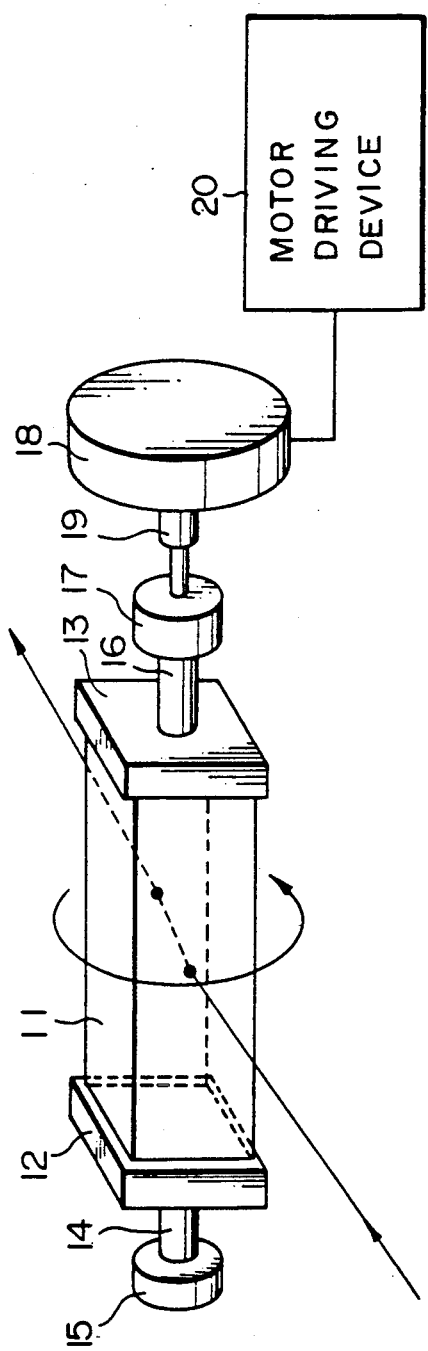
FIG. 1 is a perspective view illustrating an optical deflector in accordance with a first embodiment of the present invention, in which a polygonal prism constituted by a regular quadrangular prism is rotated by a motor.

Referring first to FIG. 1, a description will be given of an optical deflector in accordance with a first embodiment of the present invention.

In this embodiment, the optical deflector has a polygonal prism 11 constituted by a regular quadrangular prism. The polygonal prism 11 is clamped between a pair of holding members 12, 13 from opposite ends thereof. Connected to the holding member 12 is a rotating shaft 14 which is pivotally supported by a bearing 15. Meanwhile, a rotating shaft 16 which is coaxial with the rotating shaft 14 is connected to the holding member 13. One end of the rotating shaft 16 is connected to a drive shaft 19 of a motor 18 by means of a coupling 17. A motor driving device 20 is connected to the motor 18.

A beam of light is made incident upon a side surface of the polygonal prism 11, as indicated by an arrow in FIG. 1. An incident angle i of this light beam varies in a range between 45 degree and −45 degrees, and an amount of displacement of an emergent position with respect to an incident position is determined in correspondence with the incident angle i in accordance with the aforementioned Formula (1). That is, in terms of the direction of emergence, repeated scanning with the light beam is effected in a perpendicular direction (in a direction perpendicular to an axis of the polygonal prism 11) on the basis of Formula (1). Since the polygonal prism 11 in this embodiment is a regular quadrangular prism, scanning is effected by two reciprocations, i.e., a total of four cycles, in one revolution.

Hence, in accordance with this embodiment, since the optical deflector permitting repeated scanning is arranged by using the polygonal prism 11 which can be manufactured into a compact size, the apparatus can be made compact.

In addition, in this embodiment, the polygonal prism 11 rotates as the motor 18 is driven by the motor driving device 20. Since the polygonal prism 11 can be formed into a compact size, it is possible to rotate the motor 18 at high speed, with the result that high-speed scanning becomes possible.

(2) Second Embodiment

Figure 2:
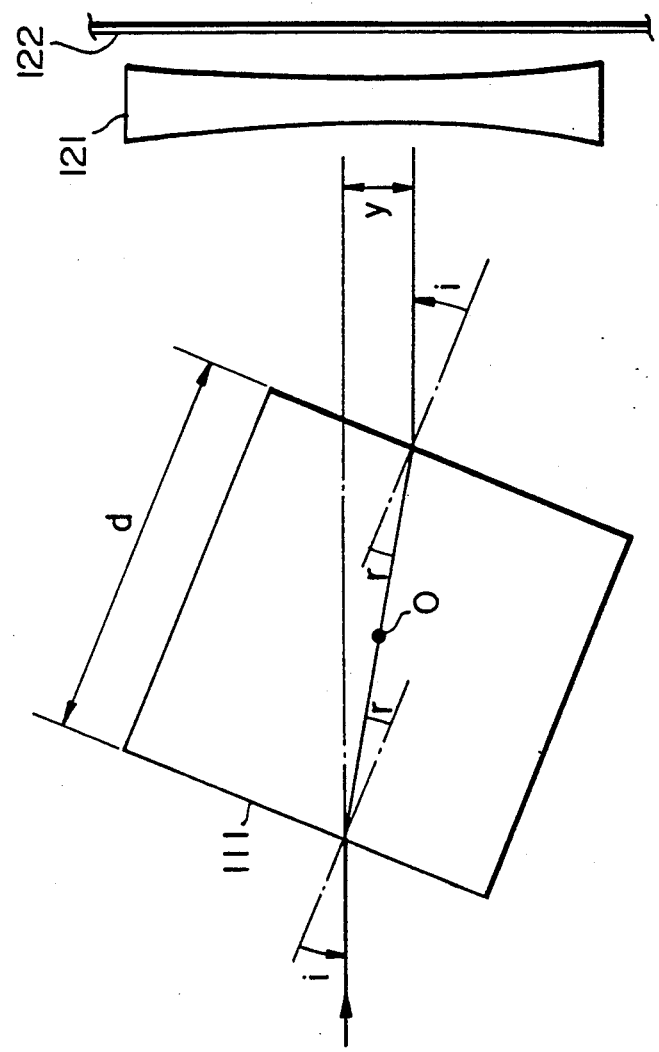
FIG. 2 is a side-elevational view schematically illustrating an arrangement of an optical deflector in accordance with a second embodiment of the present invention, in which a concave lens is added to the arrangement of the first embodiment.

FIG. 2 illustrates an arrangement of an optical deflector in accordance with a second embodiment.

In this drawing, only a polygonal prism 111, a concave lens 121, and a screen 122 are shown for the sake of simplicity.

In this embodiment, if a light beam is made incident upon a side surface of the polygonal prism 111 at an incident angle i, the light beam is refracted in correspondence with a refractive index of a substance forming the polygonal prism 111. When the light beam reaches a side surface which is opposed to the side surface relating to the incidence, the light beam is refracted in a similar manner and is made emergent at an emergent angle i. At this juncture, an amount of displacement y is produced between the incident position and the emergent position in accordance with Formula (1). The emergent light beam is made incident upon the concave lens 121. The polygonal prism 111 rotates about an axis 0 by means of a motor driving device and a motor (neither are shown). At this juncture, the concave lens 121 expands the amount of displacement y relating to the scanning with the incident light beam and causes the light beam to be projected onto the screen 122.

Accordingly, if the light beam made incident upon the polygonal prism 111 is a light beam relating to a television picture, the optical deflector of this embodiment permits the television picture to be projected in enlarged form onto the screen 122. That is, the optical deflector of this embodiment can be mounted in a projection TV.

In a case where the scanning with the emergent light beam through the rotation of the polygonal prism 111 is used for vertical scanning in a television receiver of the NTSC system, it suffices if the number of revolutions of the polygonal prism 111 is set to about 3,600/2n r.p.m. In FIG. 2, since n=4, the number of revolutions in this case becomes about 450 r.p.m.

In addition, in a case where the scanning with the emergent light beam through the rotation of the polygonal prism 111 is used for horizontal scanning in the television receiver of the NTSC system, it suffices if the number of revolutions of the polygonal prism 111 is set to about 94,500/2n r.p.m.

In these applications, a bundle of rays are subjected to brightness modulation by means of a television signal and are made incident upon the polygonal prism 111.

(3) Third and Fourth Embodiments

Although in the first and second embodiments described above the polygonal prisms are regular quadrangular prisms in both cases, the present invention is not particularly restricted in the number of the sides of the polygonal prism used. However, it is required that the polygonal prism has an even number of sides so that the directions of incidence and emergence become parallel.

Figure 3:
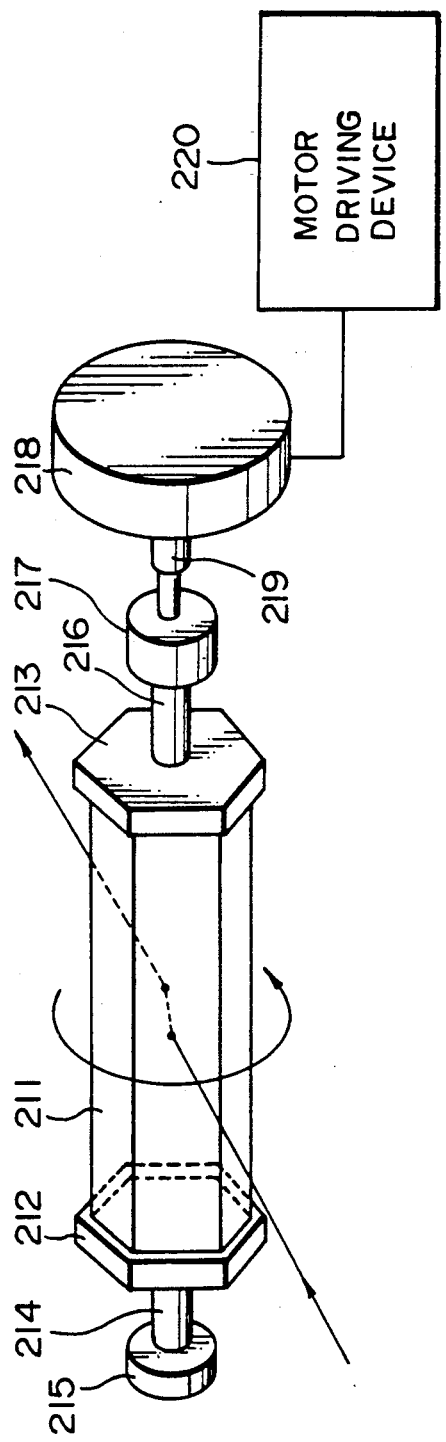
FIG. 3 is a perspective view illustrating an arrangement of an optical deflector in accordance with a third embodiment of the present invention, in which a regular hexagonal prism is used as a polygonal prism.
Figure 4:
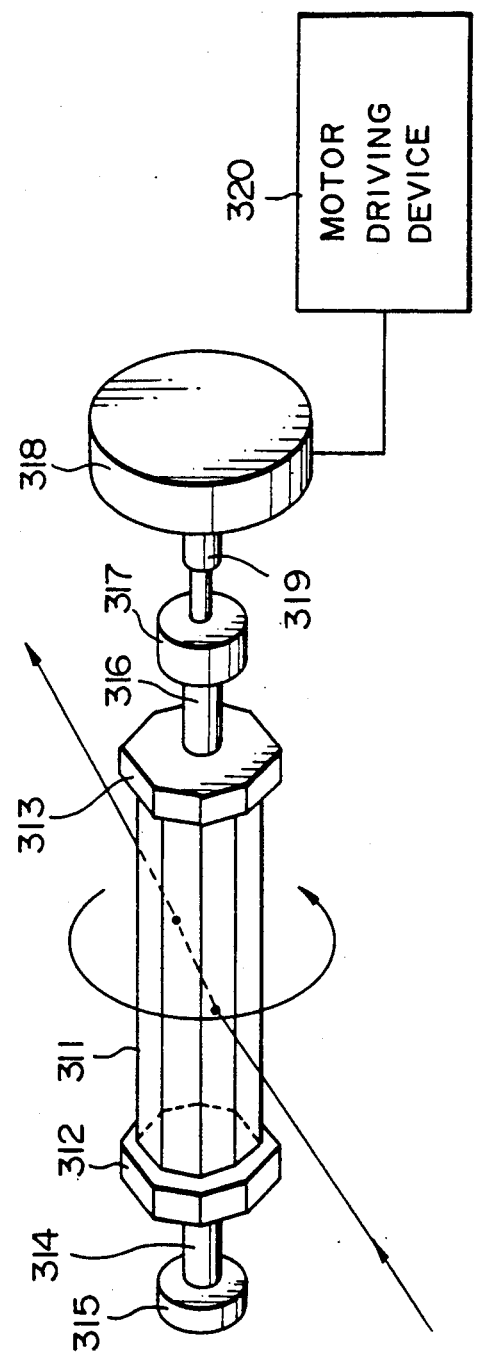
FIG. 4 is a perspective view illustrating an arrangement of an optical deflector in accordance with a fourth embodiment of the present invention, in which a regular octagonal prism is used as a polygonal prism.

In a third embodiment shown in FIG. 3, a polygonal prism 211 is a regular hexagonal prism, while, in a fourth embodiment shown in FIG. 4, a polygonal prism 311 is a regular octagonal prism. In these cases, it is possible to control the number of revolutions to a low level as compared with the case of the regular quadrangular prism.

(4) Fifth Embodiment

Figure 5:
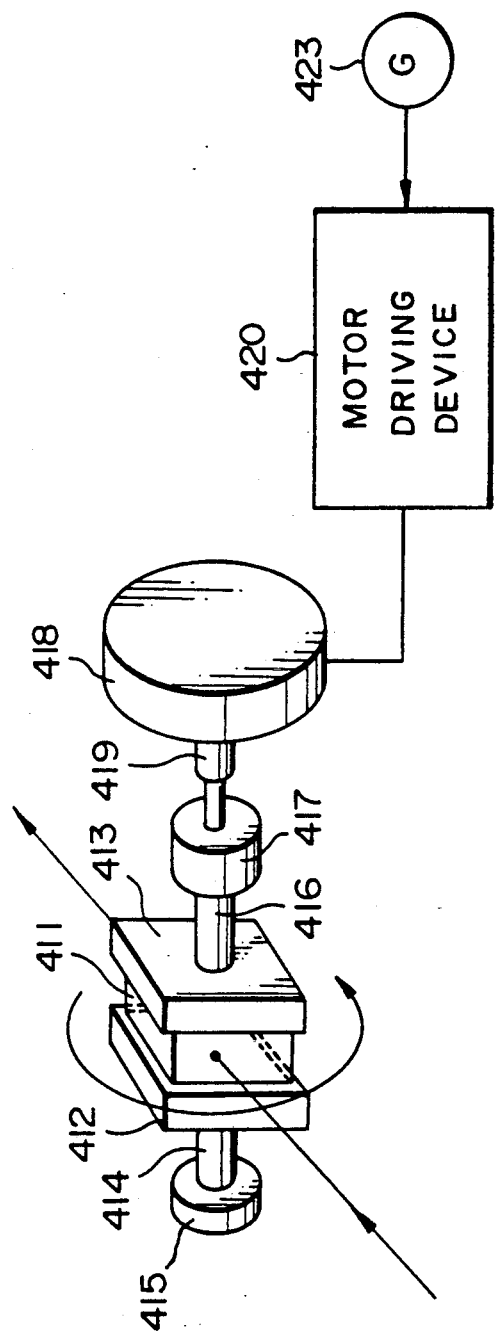
FIG. 5 is a perspective view illustrating an arrangement of an optical deflector in accordance with a fifth embodiment of the present invention, in which the polygonal prism shown has a tabular configuration and the optical deflector further includes an acceleration sensor.

In a fifth embodiment shown in FIG. 5, a polygonal prism 411 is formed into a tabular configuration, and this optical deflector is used as an optical compensator for unintentional movement of the hands during photographing of a picture.

Specifically, this optical deflector is adapted to compensate for the unintentional movement of the hands in cases where the optical deflector is inserted in an intermediate portion of an optical system of a television camera or mounted at an output terminal thereof, and the television camera is held by the hands without using a tripod or the like.

In this embodiment, an acceleration sensor 423 for detecting hand movement as an acceleration is provided so as to compensate for the unintentional movement of the hands. A motor driving device 420 rotates a motor 418 in response to the acceleration detected by the acceleration sensor 423 so as to control the posture of the polygonal prism 411.

In the case of this embodiment, since there is no need to make the light beam incident in a horizontal direction (in the axial direction of the polygonal prism 411), the polygonal prism 411 can be formed into a tabular configuration, i.e., into a compact size, so that compensation for the unintentional movement of the hands becomes possible with a compact apparatus.

(5) Sixth Embodiment

Figure 6:
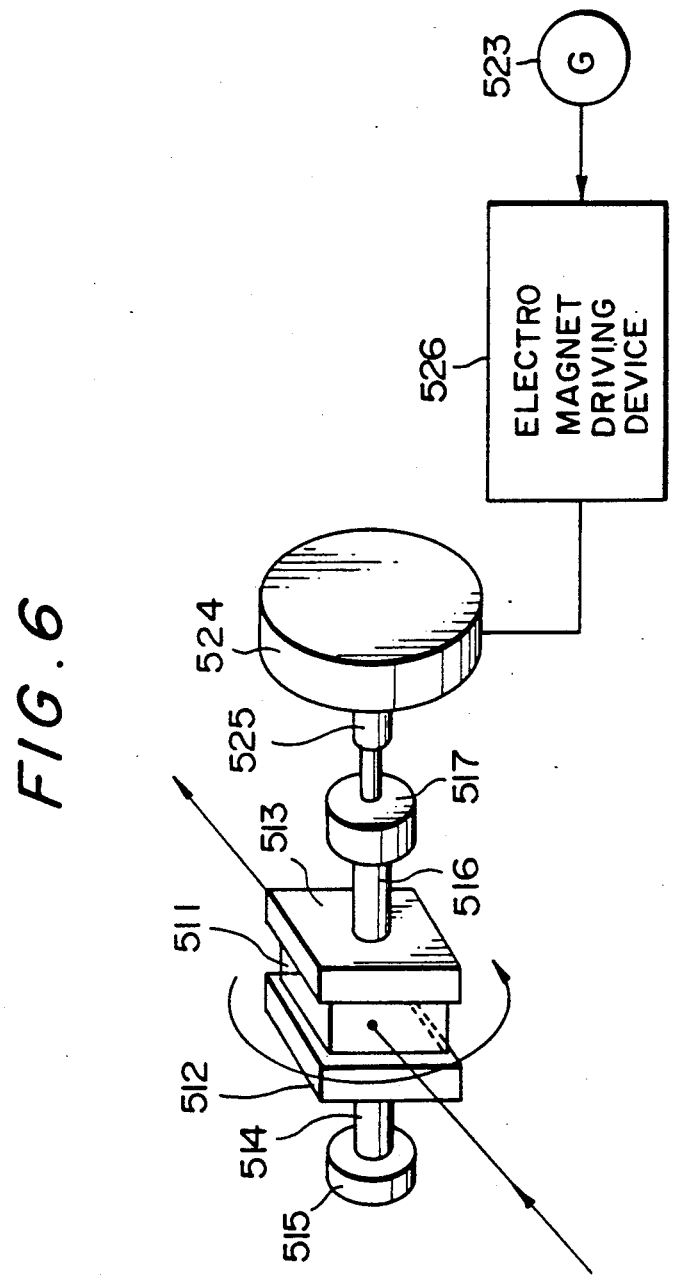
FIG. 6 is a perspective view illustrating an arrangement of an optical deflector in accordance with a sixth embodiment of the present invention, in which the optical deflector shown further includes an electromagnet and an electromagnet driving device.

As shown in FIG. 6, a sixth embodiment is provided with an electromagnet 524 and an electromagnet driving device 526.

That is, a rotating shaft 525 of the electromagnet 524 is connected to the coupling 517, and the electromagnet 524 is driven in response to an output of an acceleration sensor 523 by means of the electromagnet driving device 526.

In this embodiment as well, a similar effect to that of the fifth embodiment can be obtained.

(6) Seventh Embodiment

Figure 7:
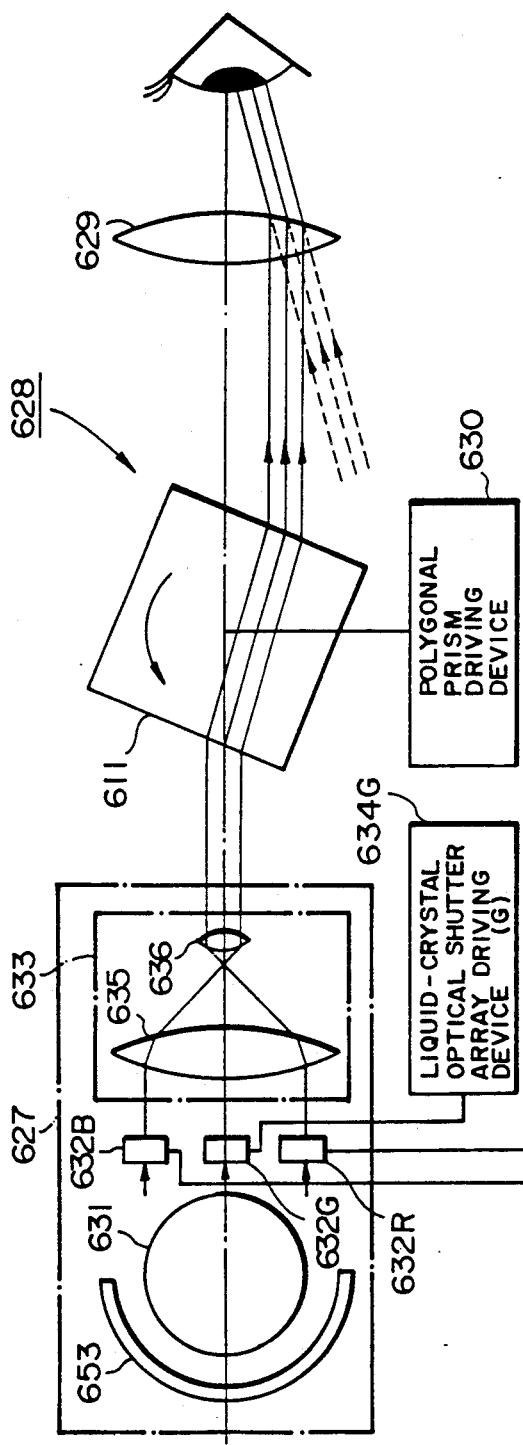
FIG. 7 is a side-elevational view schematically illustrating an arrangement of a display unit in accordance with a seventh embodiment of the present invention, in which color display is made possible by the use of three liquid-crystal optical shutter arrays of R, G, and B.

FIG. 7 illustrates an arrangement of a display unit in accordance with a seventh embodiment of the present invention.

The display unit in accordance with this embodiment has a color image display unit (hereinafter simply referred to as the "display unit") 627 for one horizontal scanning line, an optical deflector 628, and an eyepiece 629.

The optical deflector 628 has a polygonal prism 611 constituted by a regular quadrangular prism and a polygonal prism driving device 630 for rotatively driving the polygonal prism 611 at a predetermined speed. In other words, the optical deflector 628 has a configuration similar to that of the optical deflector of the first embodiment.

The display unit 627 has a light source 631, a reflecting mirror 654, liquid-crystal optical shutter arrays 632R, 632G, 632B, and a converging lens 633. Liquid-crystal optical shutter array driving devices 634R, 634G, 634B are respectively connected to the liquid-crystal optical shutter arrays 632R, 632G, 632B. The converging lens 633 is formed by combining two cylindrical lenses 635, 636.

Figure 8:
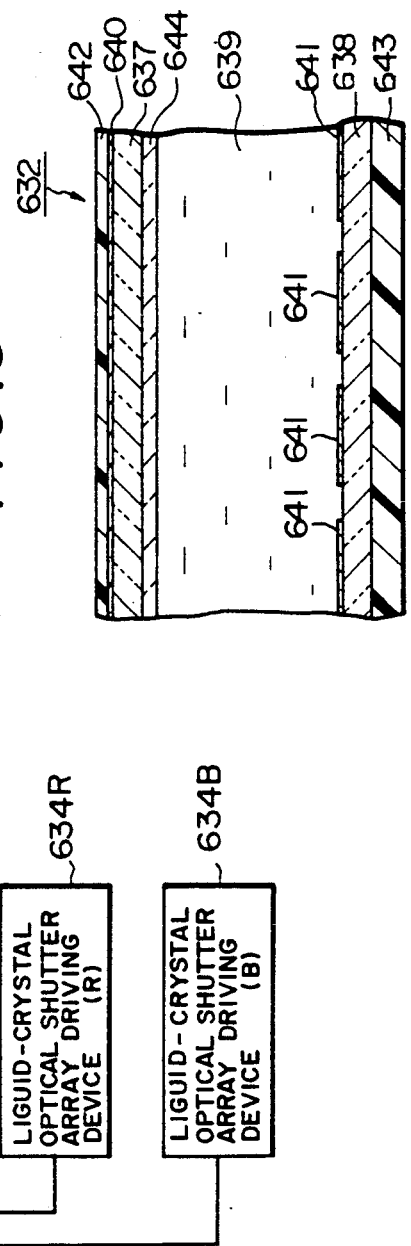
FIG. 8 is a cutaway cross-sectional view of the liquid crystal optical shutter array in accordance with the seventh embodiment.
Figure 9:
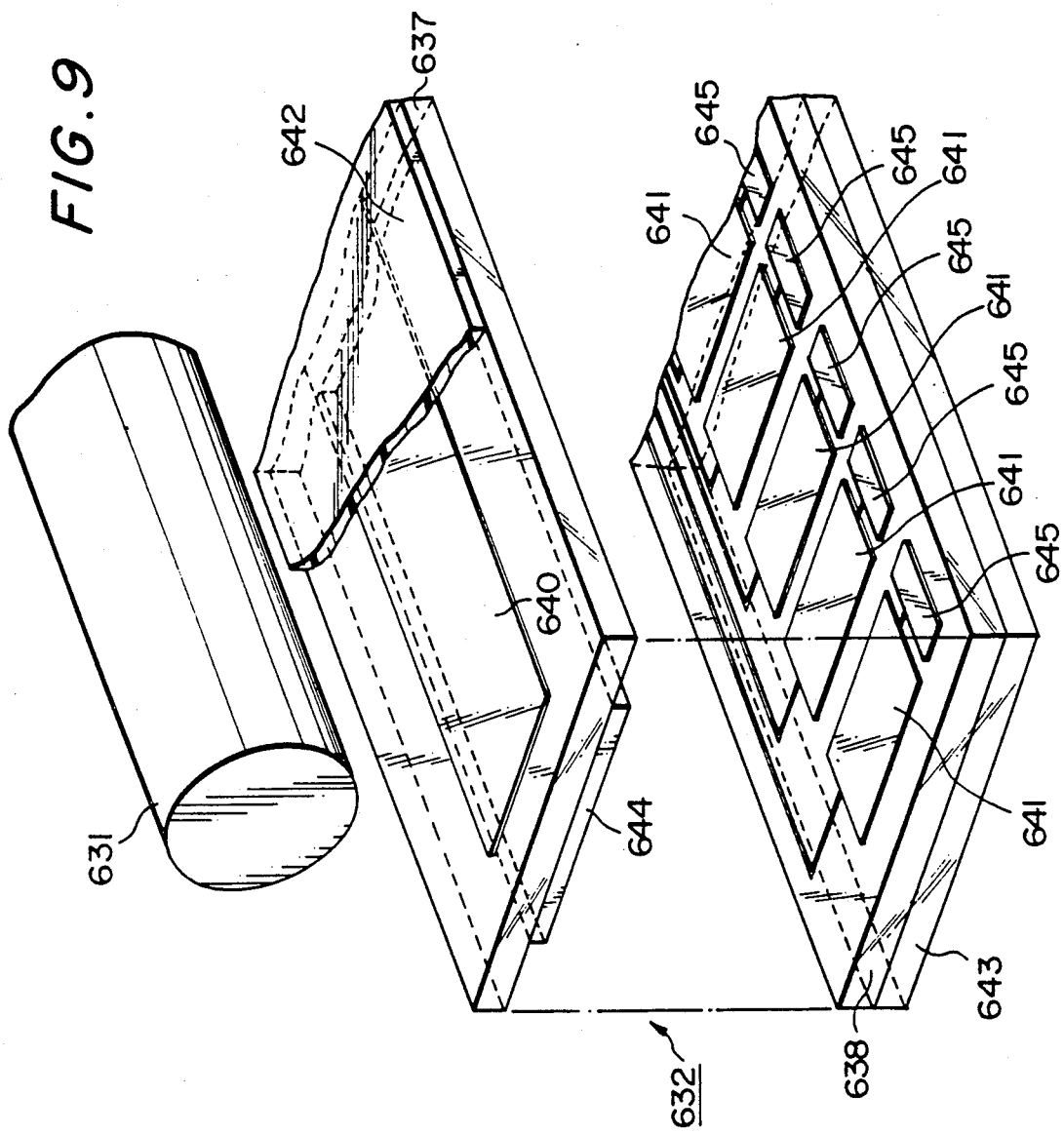
FIG. 9 is a cutaway perspective view of the liquid crystal optical shutter array in accordance with the seventh embodiment.

FIG. 8 is a cutaway cross-sectional view of the liquid-crystal optical shutter array 632 used in this embodiment, and FIG. 9 illustrates a three-dimensional configuration thereof.

In FIG. 8, a liquid crystal 639 is sealed in between glass plates 637 and 638. This liquid crystal 639 is a ferroelectric liquid crystal having two bistable states. That is, in this liquid crystal, molecules of the liquid crystal are voluntarily polarized by electricity and undergo transition between the two bistable states within a short time in correspondence with the positive and negative charges of an electric field applied from the outside.

A common electrode 640 is disposed on the glass plate 637, and individual electrodes 641 are disposed on the glass plate 638. Both the common electrode 640 and the individual electrodes 641 are transparent electrodes formed of ITO or other similar substances. The common electrode 640 is provided integrally in the longitudinal direction (in the horizontal direction in the drawing) of the liquid-crystal optical shutter array 632. The individual electrodes 641 are arrayed in the same direction in divided form in a predetermined number (corresponding to the number of picture elements).

A polarizing plate 642 is disposed on the upper surface of the glass plate 637 via the common electrode 640, while a polarizing plate 643 is disposed on the lower surface of the glass plate 638. These polarizing plates 642, 643 are set in such a manner that their polarizing planes are shielded from the light beam in either state of the bistable state. That is, the light beam is not transmitted through the liquid crystal 639 if the liquid crystal 639 is in either one of the bistable states, while the light beam is transmitted therethrough if the liquid crystal 639 is in the other state of the bistable states.

The liquid-crystal optical shutter array 632 having such an arrangement has the same arrangement as that disclosed in, for instance, Japanese Patent Laid-Open No. 5326/1988.

In this embodiment, a filter 644 is provided on the lower surface of the glass plate 637. Each filter 644 is adapted to allow the light beam of one of the three primary-color components, red, green, and blue, to be transmitted therethrough. As described above, three types, R, G, and B, are provided as the liquid-crystal optical shutter array 632 of this embodiment, and this means that these types of the liquid-crystal optical shutter array 632 are respectively provided with filters 644 each allowing the light beam of one of the color components, red, green, and blue, to be transmitted therethrough.

FIG. 9 illustrates such an arrangement in perspective.

In this drawing, the liquid crystal 639 is omitted for the sake of explanation. In addition, as is clearly shown in this drawing, the liquid-crystal optical shutter array 632 is so arranged that the common electrode 640 is located on the light source 631 side.

In this drawing, a driving portion 645 is provided for each individual electrode 641. The driving portion 645 is formed of a thin-film transistor, and its circuit configuration is shown in FIG. 10.

Figure 10:
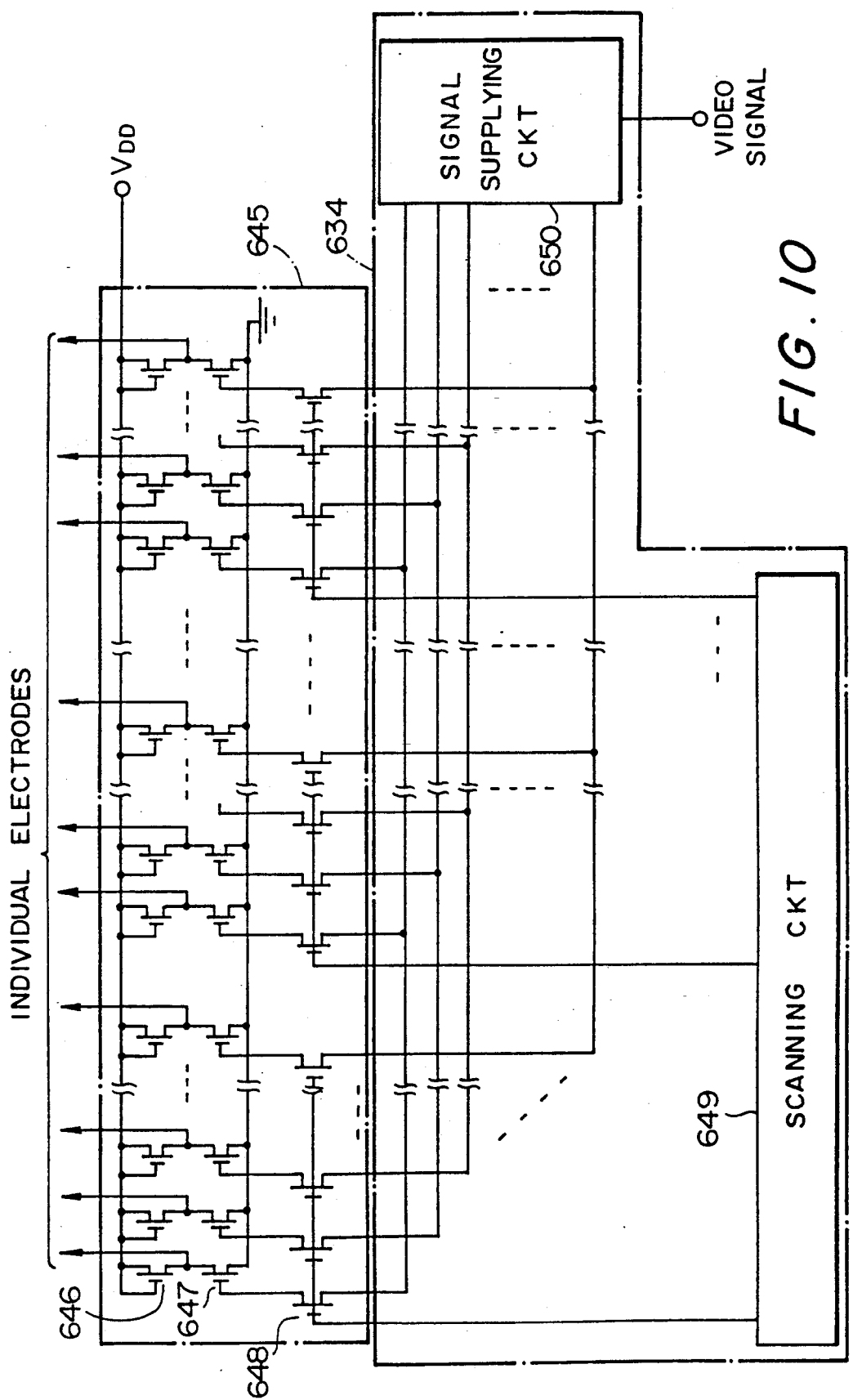
FIG. 10 is a circuit diagram illustrating a configuration of the liquid-crystal optical shutter array in accordance with the seventh embodiment.

In FIG. 10, the driving portion 645 corresponds to each individual electrode 641 and includes thin-film transistors 646, 647, 648 whose numbers correspond to the number of picture elements. The thin film transistor 646 functions as a load resistance to the thin-film transistor 647. A supply voltage VDD is applied to the thin-film transistor 647 via the thin film transistor 646 connected to a drain. A connecting line with the individual electrode 641 is taken out from the drain of the thin-film transistor 647, and the source of the thin-film transistor 647 is grounded, one half of the voltage $V_{DD}$ is applied to the individual electrode 641.

The source of the thin-film transistor 648 is connected to the gate of the thin-film transistor 647. The gates of the thin-film transistors 647 are short-circuited in units of a predetermined number of gates. This unit of short-circuiting will be called a block.

A scanning circuit 649 is connected to the gate of the thin-film transistor 648. In addition, a signal supplying circuit 650 is connected to the drain of the thin-film transistor 648. The scanning circuit 649 and the signal supplying circuit 650 constitute a liquid-crystal optical shutter array driving device 634.

In this embodiment, signals that are supplied to the drains of the respective thin-film transistors 648 are video signals corresponding to the respective picture elements. That is, if a video signal is supplied from the signal supplying circuit 650 to the drain of the thin-film transistor 648 with the thin-film transistor 648 on, this video signal is supplied to the liquid crystal 639 via the thin-film transistor 647. The liquid crystal 639 thereupon assumes one state of the bistable state. In other words, the light is transmitted or shielded by each picture element of the liquid-crystal optical shutter array 632 in correspondence with the video signal.

A signal for switching on or off the thin-film transistor 648 is a block selection signal supplied from the scanning circuit 649 to the gate of the thin-film transistor 648. As described above, the liquid crystal 639 is a ferroelectric liquid crystal and has a relatively short transition time between the bistable states, on an order comparable with one horizontal cycle (approx. 63.5 $\mu$sec) of the NTSC system. Accordingly, it is preferable to effect driving for each block in order to obtain leeway in time for driving, displaying and erasing the liquid-crystal optical shutter array 632 in cases such as where a high contrast ratio is to be obtained. Hence, in this embodiment, the shifting of the transmission and shielding of the light beam is carried out for each block.

Specifically, the video signal of the thin-film transistor 648 is latched until a block selection signal is supplied, and the shifting of the transmission and shielding of the light beam is effected in units of blocks in correspondence with the arrival of the block selection signal. The block selection signal is supplied sequentially to all the blocks, and all the blocks are driven in one horizontal cycle.

As a result, if seen in units of blocks, the display time is prolonged, so that a high contrast ratio can be realized. In addition, the response performance of the switching of the thin-film transistor 648 can be low.

The overall operation of the this embodiment will be described hereinunder.

First, a light beam is supplied from the light source 631, and after being converted into parallel light beams by the reflecting mirror 653, this light beam is made incident upon the respective liquid-crystal optical shutter arrays 632R, 632G, 632B.

The liquid-crystal optical shutter arrays 632R, 632G, 632B are driven by the corresponding liquid-crystal optical shutter array driving devices 634R, 634G, 634B, as described above, with the result that the light beams of the three colors, R, G, B, are made emergent while being transmitted or shielded.

These light beams are made incident upon the converging lens 633. The converging lens 633 causes the light beams made incident thereto at the same intervals as the intervals of arrangement of the liquid-crystal optical shutter arrays 632R, 632G, 632B to be converged onto the vicinity of a predetermined axis.

The converged light beam is made incident upon the polygonal prism 611. The polygonal prism 611 makes the light emergent therefrom while conducting repeated scanning in accordance with Formula (1). Here, since the light of each color has been converged paraxially by the converging lens 633, it can be assumed that the scanning operation has made a turn back simultaneously for each color.

The light beam made emergent from the polygonal prism 611 is made incident upon the eyepiece 629. The eyepiece 629 is a convex lens having a predetermined focal point. Now, it is assumed that a visual point is located at this focal point. At this juncture, the light beam made incident upon the eyepiece 629 along an optical path indicated by the solid line in FIG. 7 is viewed as if it has arrived from the direction of the broken line. When the polygonal prism 611 is driven by the polygonal prism driving device 630, the repeated scanning of the polygonal prism 611 is effected, and the viewer visually senses a screen of a size determined by the configuration of the polygonal prism 611.

It should be noted that the eyepiece 629 can be designed in correspondence with the size of the visually sensed screen. The rotational cycle of the polygonal prism 611 needs to be determined in correspondence with the vertical scanning cycle of the video signal.

Accordingly, in accordance with this embodiment, it suffices to provide a display unit corresponding to picture elements for one horizontal cycle, so that the display unit can be made compact and produced at high yield and low cost. Furthermore, it is possible to enhance the resolution through high-speed rotation of the polygonal prism 611, as necessary. As a result, the display unit is suitable for use as a viewfinder of a camera.

(7) Eighth Embodiment

Figure 11:
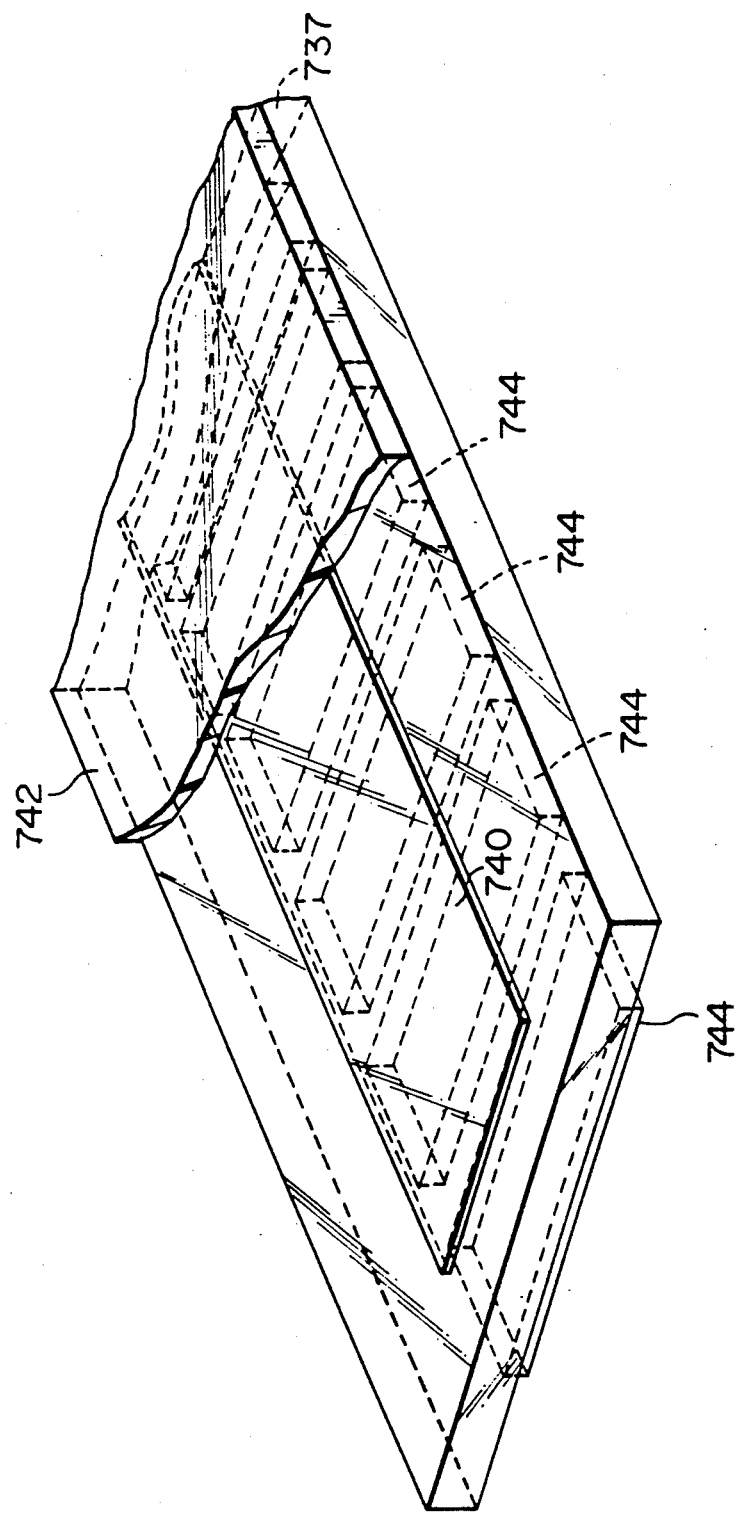
FIG. 11 is a cutaway perspective view illustrating an arrangement of the vicinity of a common electrode of a display unit in accordance with an eighth embodiment of the present invention.

FIG. 11 illustrates an arrangement of a display unit in accordance with an eighth embodiment of the present invention. In this drawing, only the arrangement in the vicinity of a common electrode 740 is shown for the sake of simplicity.

In this embodiment, filters 744 are provided in divided form for each picture element. In this arrangement, if the adjacent filters 744 are filters that allow the light of different colors to be transmitted therethrough, it is possible to handle a plurality of colors with one liquid-crystal optical shutter array. As a result, the arrangement of the display unit can be made compact and the display units can be produced at low cost.

It should be noted that the filters 744 disposed in adjacent relation on one liquid-crystal optical shutter array are preferably red or blue filters which do not relatively contribute to the resolution.

(8) Ninth Embodiment

Figure 12:
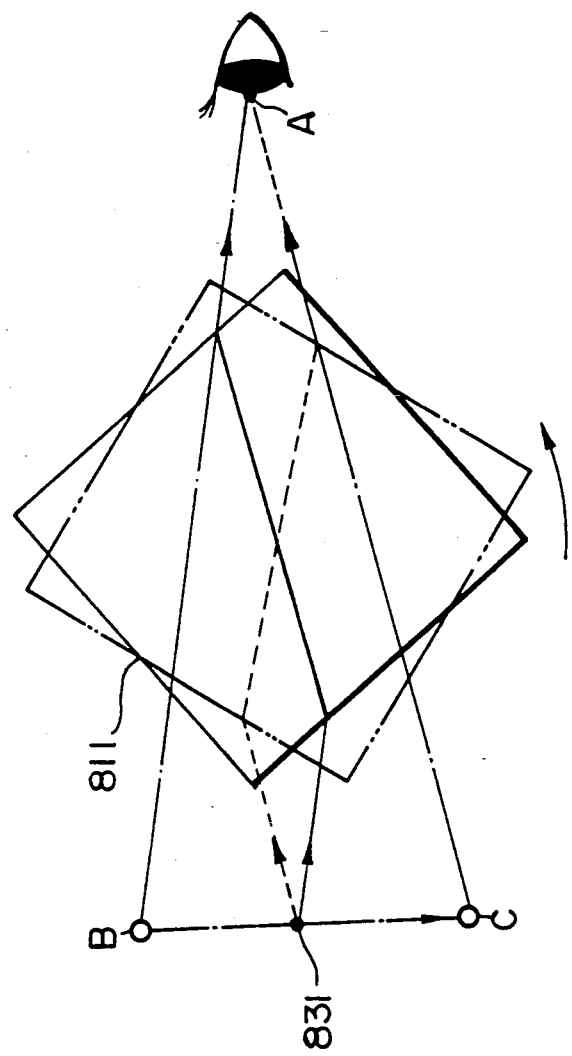
FIG. 12 is a side-elevational view schematically illustrating a display unit in accordance with a ninth embodiment of the present invention, in which a light beam supplied from a light source is viewed on a television screen.

FIG. 12 illustrates an arrangement of a display unit in accordance with a ninth embodiment of the present invention. In this drawing, only the arrangement in the vicinity of a polygonal prism 811 is shown for the sake of simplicity.

A case will now be considered in which a light beam having a certain expanse is made incident upon the polygonal prism 811 from a light source 831 indicated by a spot in the drawing. At this time, if the polygonal prism 811 is located at the position indicated by the solid lines, the light beam is viewed as if it has arrived from the direction of point B. Similarly, if the polygonal prism 811 is located at the position indicated by the broken lines, the light beam is viewed as if it has arrived from the direction of point C. Accordingly, the light source 831 appears to be vertically moving owing to the rotation of the polygonal prism 811.

If a display unit for one horizontal cycle is used as the light source 831, a television picture can be displayed in accordance with this embodiment, and the arrangement of the display unit can be made compact.

(9) 10th Embodiment

Figure 13:
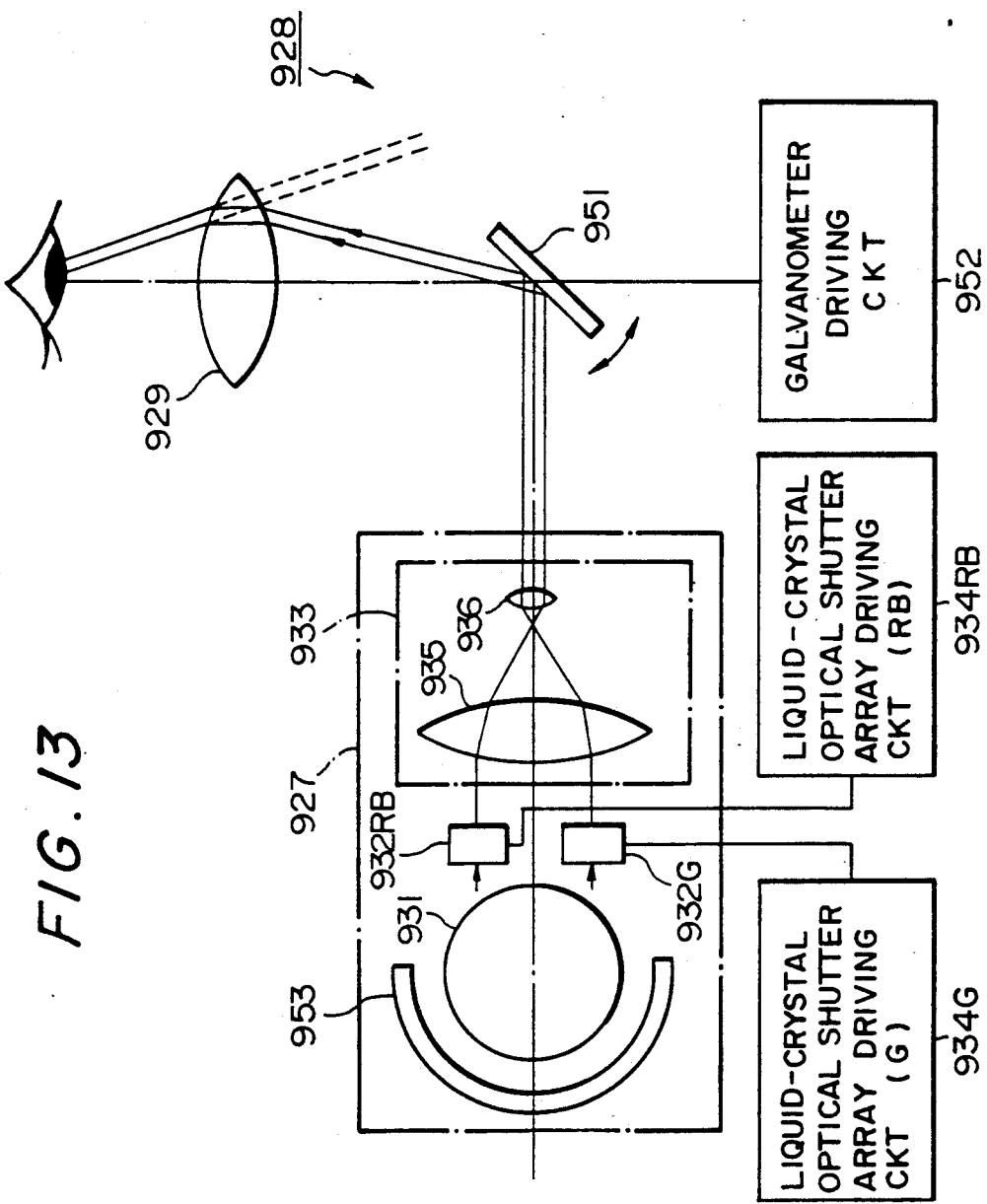
FIG. 13 is a side-elevational view schematically illustrating an arrangement of a display unit in accordance with a tenth embodiment of the present invention, in which a movable mirror is oscillated by a galvanometer driving circuit.
Figure 14:
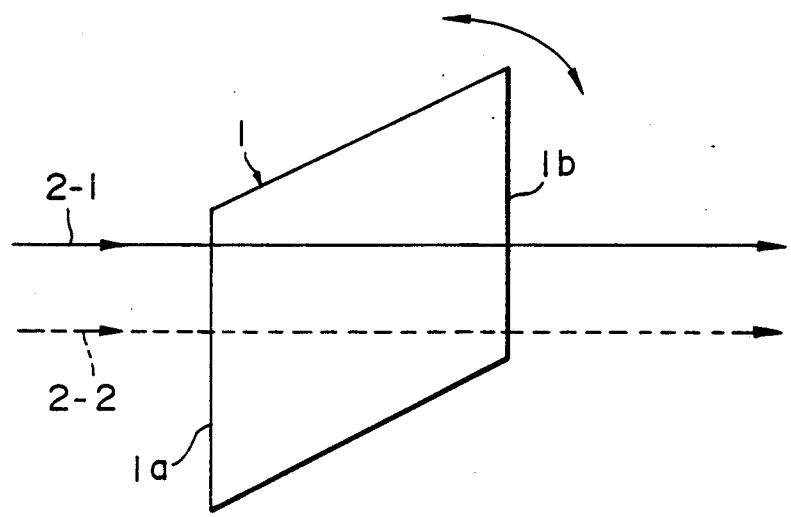
FIG. 14 is a side-elevational view schematically illustrating an example of an arrangement of a conventional optical deflector, in which a rhomboid prism is at a first position.
Figure 15:
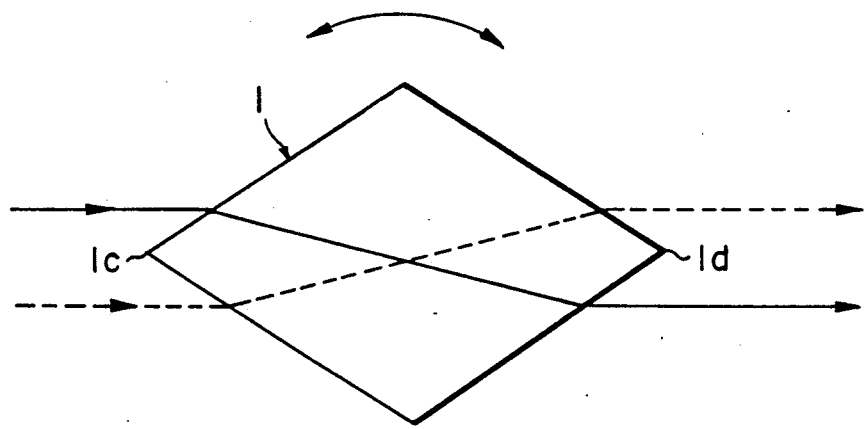
FIG. 15 is a side-elevational view schematically illustrating a state in which the rhomboid prism of the optical deflector shown in FIG. 14 is at a second position.

FIG. 13 illustrates an arrangement of a display unit in accordance with a 10th embodiment of the present invention.

In this embodiment, liquid-crystal optical shutter arrays relating to red and blue are arranged as one liquid crystal optical shutter array 932RB in a manner similar to that of the eighth embodiment. In addition, a liquid-crystal optical shutter array driving circuit 934RB is provided correspondingly.

The feature of this embodiment resides in that an optical deflector 928 comprises a movable mirror 951 and a galvanometer driving circuit 952.

Specifically, a light beam made emergent from a converging lens 933 is deflected by the swinging of the movable mirror 951, and is made incident upon an eyepiece 929. The galvanometer driving circuit 952 causes the movable mirror 951 to swing with a cycle corresponding to a vertical cycle.

Accordingly, with this embodiment as well, it is possible to obtain a compact display unit in the same way as the seventh embodiment. It should be noted that it suffices if the movable mirror 951 is disposed on a galvanometer (not shown), and its length may be determined in correspondence with the length of a liquid-crystal optical shutter array 932.

Although in the foregoing embodiments a description has been given of applications of the optical deflector concerning display unit, in particular, the optical deflector may be applied to a galvanometer and a telecine apparatus.

In addition, it is also possible to arrange a monochromatic display unit as a display unit.

The invention being thus described, it will be obvious that the same may be varied in many ways. Such variations are not to be regarded as a departure from the spirit and scope of the invention, an all such modifications as would be obvious to one skilled in the art are intended to be included within the scope of the following claims.

What is claimed is:

1. An optical deflector, housed within portable hand-held housing, comprising:
    a polygonal prism of n sides, wherein n is an even number, for refracting a light beam incident upon a first side surface thereof to be emergent, in a substantially parallel direction to a direction of incidence, from a second side surface opposing said first side surface; and
    polygonal prism driving means for rotating said polygonal prism about a central axis at a predetermined speed comprising
        electromagnet means for stopping said polygonal prism at a predetermined position,
        an acceleration sensor for detecting acceleration due to movement of the portable hand-held housing, and
        electromagnet driving means for controlling a stopping position of said polygonal prism with said electromagnet means in correspondence with said detected acceleration to compensate for movement of the portable hand-held housing.

2. The optical deflector according to claim 1, wherein said polygonal prism is a regular quadrangular prism.

3. The optical deflector according to claim 1, wherein said polygonal prism is a regular hexagonal prism.

4. The optical deflector according to claim 1, wherein said polygonal prism is a regular octagonal prism.

5. The optical deflector according to claim 1, wherein said polygonal prism is a polygonal flat plate.

6. The optical deflector according to claim 1, further comprising a concave lens for enlarging and projecting the emergent light beam onto a screen.

7. An optical deflector, housed within a portable hand-held housing, comprising:
    a polygonal prism of even-numbered sides for refracting a light beam incident upon a first side surface thereof to emerge from a second side surface, opposite said first side surface, in a direction substantially parallel to a direction of incidence of said light beam;

rotational driving means for rotating said polygonal prism about a central axis to displace said emergent light beam, a point of emergence of said emergent light beam on said second side surface being displaced a displacement distance along a direction of rotation of said polygonal prism; and movement compensation means, coupled to said rotational driving means, for detecting acceleration due to movement of the portable hand-held housing, to generate an acceleration signal, said rotational driving means rotating said polygonal prism to a proper rotational angle in accordance with said acceleration signal to compensate for unintentional movement of the portable hand-held housing.

8. The optical deflector of claim 7, wherein said rotational driving means comprises:

electromagnet means for rotationally driving said polygonal prism; and electromagnet driving means, coupled to said movement compensation means, for driving said electromagnet means in accordance with said acceleration signal.

9. The optical deflector of claim 7, further comprising a concave lens for enlarging and projecting said emergent light beam onto a screen.

10. The optical deflector of claim 7, wherein said polygonal prism is a regular quadrangular prism.

11. The optical deflector of claim 7, wherein said polygonal prism is a regular hexagonal prism.

12. The optical deflector of claim 7, wherein said polygonal prism is a regular octagonal prism.

13. The optical deflector of claim 7, wherein said polygonal prism is a polygonal flat plate.

14. A method of deflecting a light beam with an optical deflector which includes a polygonal prism of even-numbered sides, the optical deflector being housed within a portable hand-held housing, comprising the steps of:

projecting a light beam on a first side surface of the polygonal prism to refract the light beam to be emergent from a second side surface, opposite the first side surface, in a direction substantially parallel to a direction of incidence of the light beam;

rotating the polygonal prism, using rotational driving means, about a central axis to displace the emergent light beam, a point of emergence of ht emergent light beam on the second side surface being displaced a displacement distance along a direction of rotation of th polygonal prism;

detecting acceleration, using an acceleration sensor, to generate an acceleration signal indicative of unintentional movement of the portable hand-held housing; and rotating the polygonal prism in accordance with the acceleration signal, via the rotational driving means, to compensate for unintentional movement of the portable hand-held housing.

* * * * *